(No Model.)

W. H. BROOKS.

APPARATUS FOR GENERATING VAPOR FROM LIQUID HYDROCARBON.

No. 272,373. Patented Feb. 13, 1883.

6 Sheets—Sheet 2.

WITNESSES:

INVENTOR.
William H. Brooks,
By James L. Norris.
ATTORNEY.

(No Model.) 6 Sheets—Sheet 4.

W. H. BROOKS.

APPARATUS FOR GENERATING VAPOR FROM LIQUID HYDROCARBON.

No. 272,373. Patented Feb. 13, 1883.

WITNESSES: INVENTOR.
William H. Brooks.
By James L. Norris.
ATTORNEY (No Model.) 6 Sheets—Sheet 5.
W. H. BROOKS.
APPARATUS FOR GENERATING VAPOR FROM LIQUID HYDROCARBON.
No. 272,373. Patented Feb. 13, 1883.
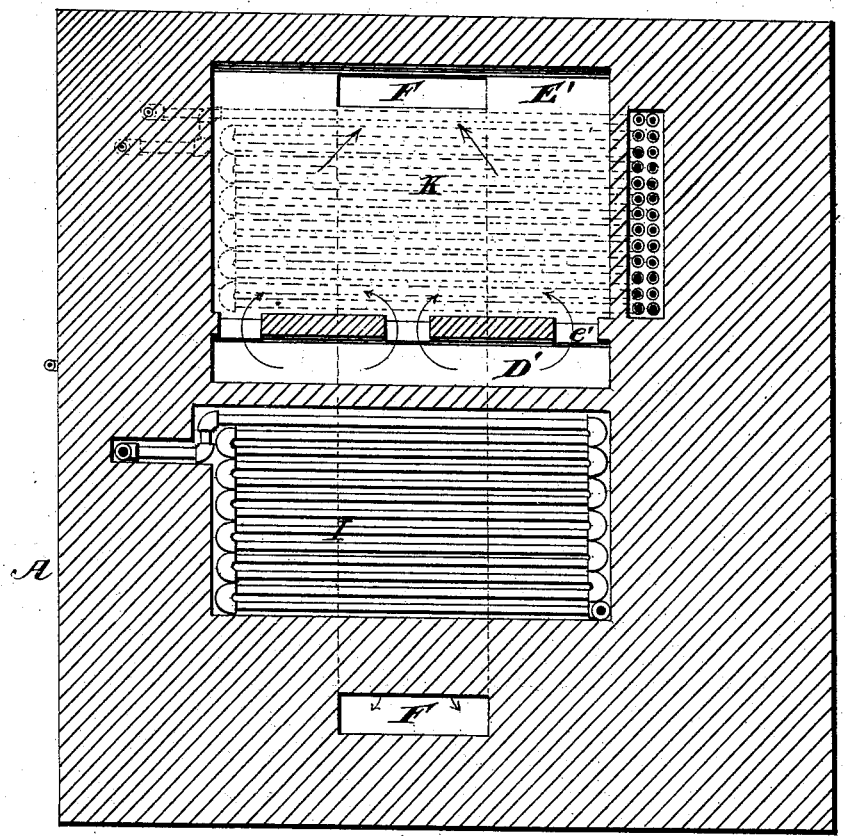
WITNESSES:
INVENTOR.
William H. Brooks.
By James L. Norris.
ATTORNEY (No Model.)
6 Sheets—Sheet 6.
W. H. BROOKS.
APPARATUS FOR GENERATING VAPOR FROM LIQUID HYDROCARBON.
No. 272,373.
Patented Feb. 13, 1883.
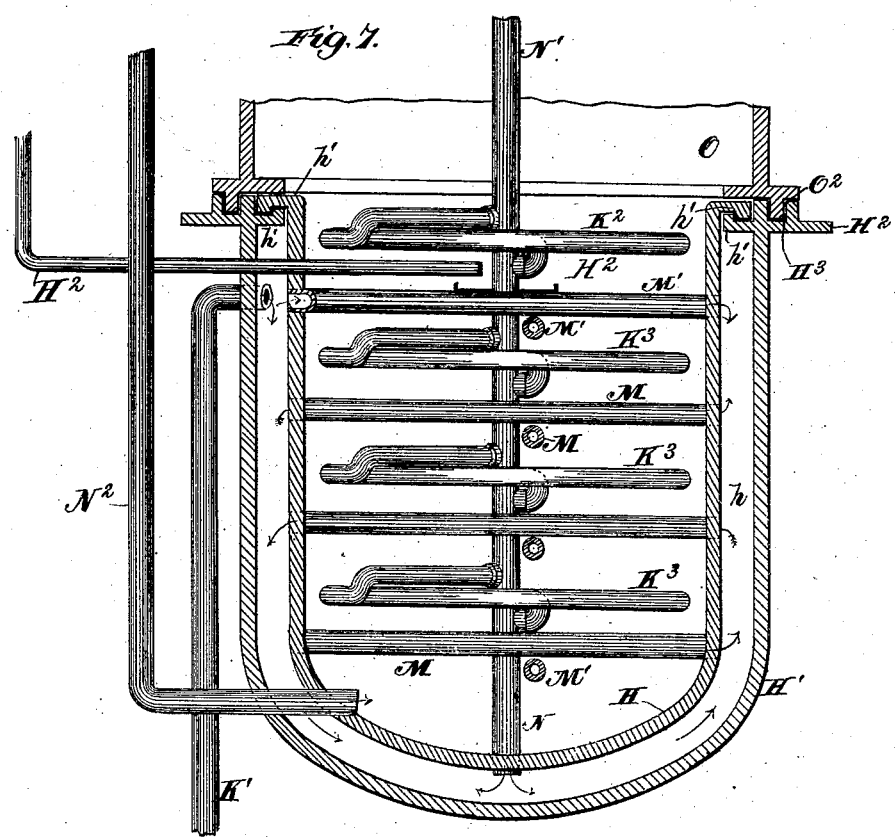
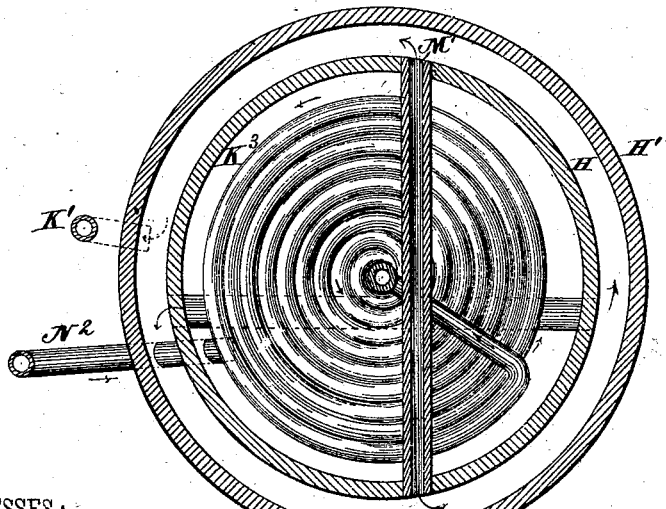
WITNESSES:
Fred. G. Dieterich
J. A. Rutherford
INVENTOR.
William H. Brooks.
By James L. Norris,
ATTORNEY
N. PETERS. Photo-Lithographer. Washington, D. C.

UNITED STATES PATENT OFFICE.

WILLIAM H. BROOKS, OF NEW YORK, N. Y.

APPARATUS FOR GENERATING VAPOR FROM LIQUID HYDROCARBON.

SPECIFICATION forming part of Letters Patent No. 272,373, dated February 13, 1883.

Application filed December 8, 1882. (No model.)

*To all whom it may concern:*

Be it known that I, WILLIAM H. BROOKS, a citizen of the United States, residing at New York, in the county and State of New York, have invented new and useful Improvements in Apparatus for Generating Vapor from Liquid Hydrocarbons, of which the following is a specification.

This invention relates to that class of vapor-generators in which superheated steam is employed for vaporizing liquid hydrocarbons, and the vapor-gas thus produced utilized as fuel in the manufacture of iron and steel, and for other purposes.

The objects of my improvement are to provide efficient means for superheating the steam, which is conducted from a boiler to the vaporizing-chamber; also, to provide a novel construction of apparatus whereby the vaporizing-cylinder is heated by means of superheated steam, which is also conducted by pipes or flues through the liquid hydrocarbon or other oleaginous material within the cylinder, and then injected into the liquid hydrocarbon, so as to vaporize and carry off the vapor-gas to be burned; also, to construct and arrange the vaporizing apparatus so that the heat from the latter shall be utilized, both for superheating the steam as it passes through coils of pipe in the furnace-walls and also for heating a jacket which surrounds the vaporizing-cylinder, so as to provide a steam-space, into which the steam heated in the first instance in the pipes in the furnace-walls enters and is distributed around the vaporizing-cylinder before entering the coils of pipe arranged within the said cylinder; also, to provide a tight, simple, and conveniently-constructed joint between the vaporizing-cylinder and its cap or dome, all as hereinafter more fully described, and illustrated in the annexed drawings, in which—

Figure 1:
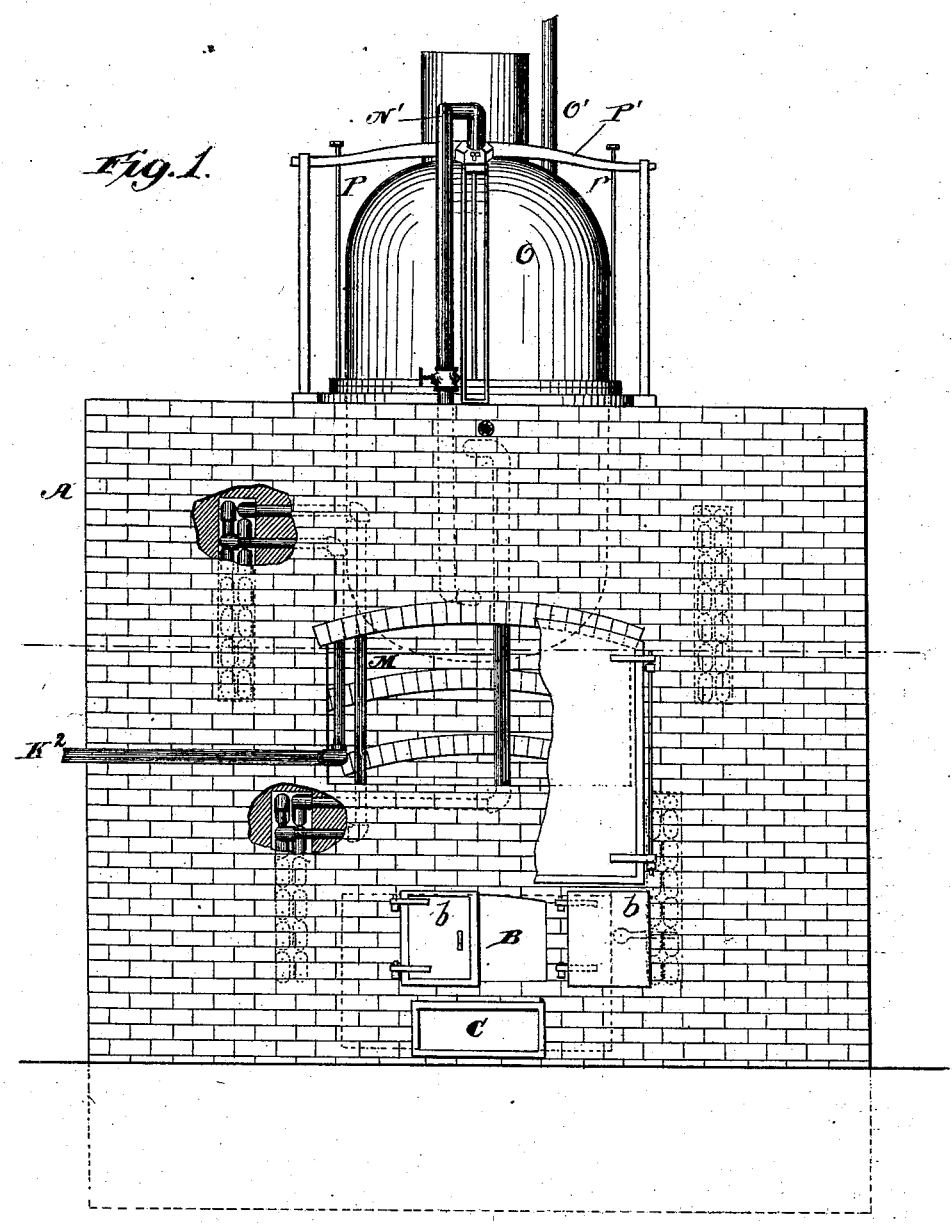
Figure 2:
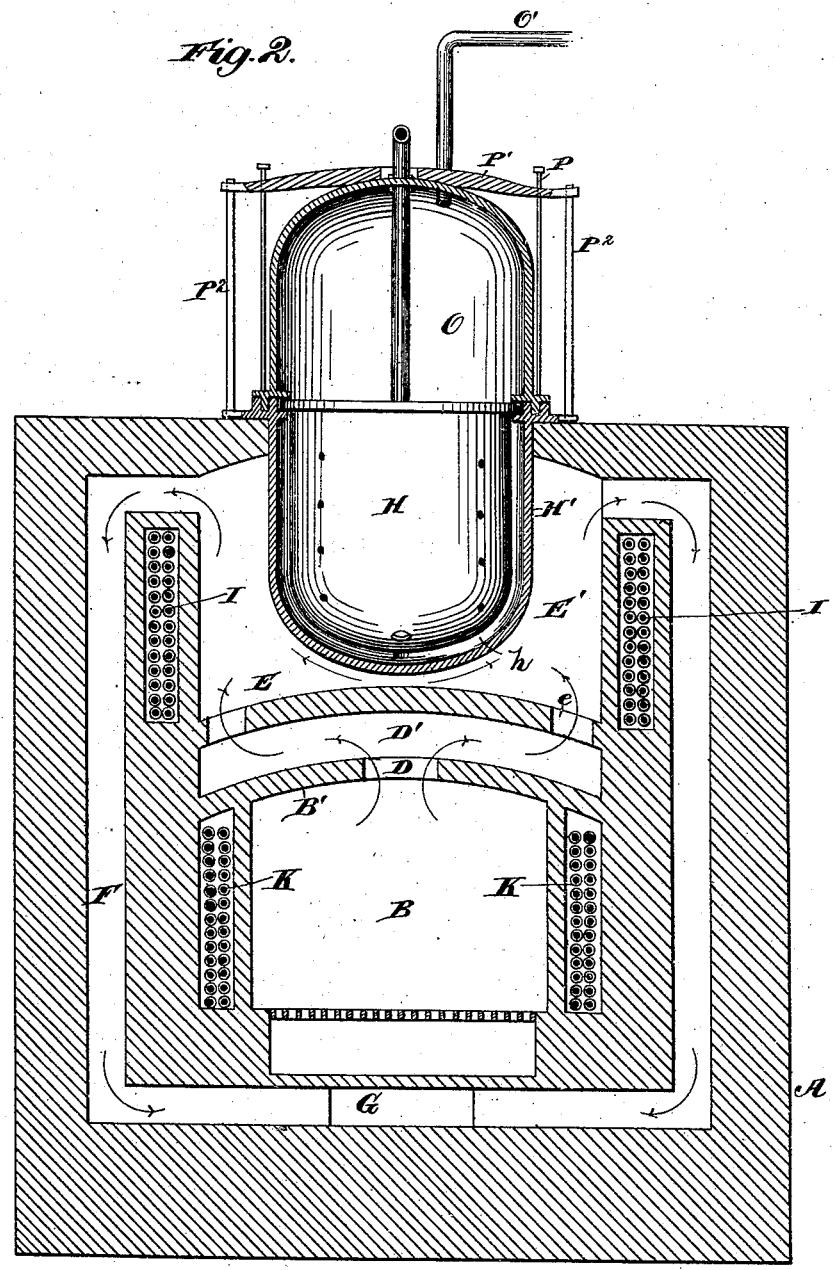
Figure 3:
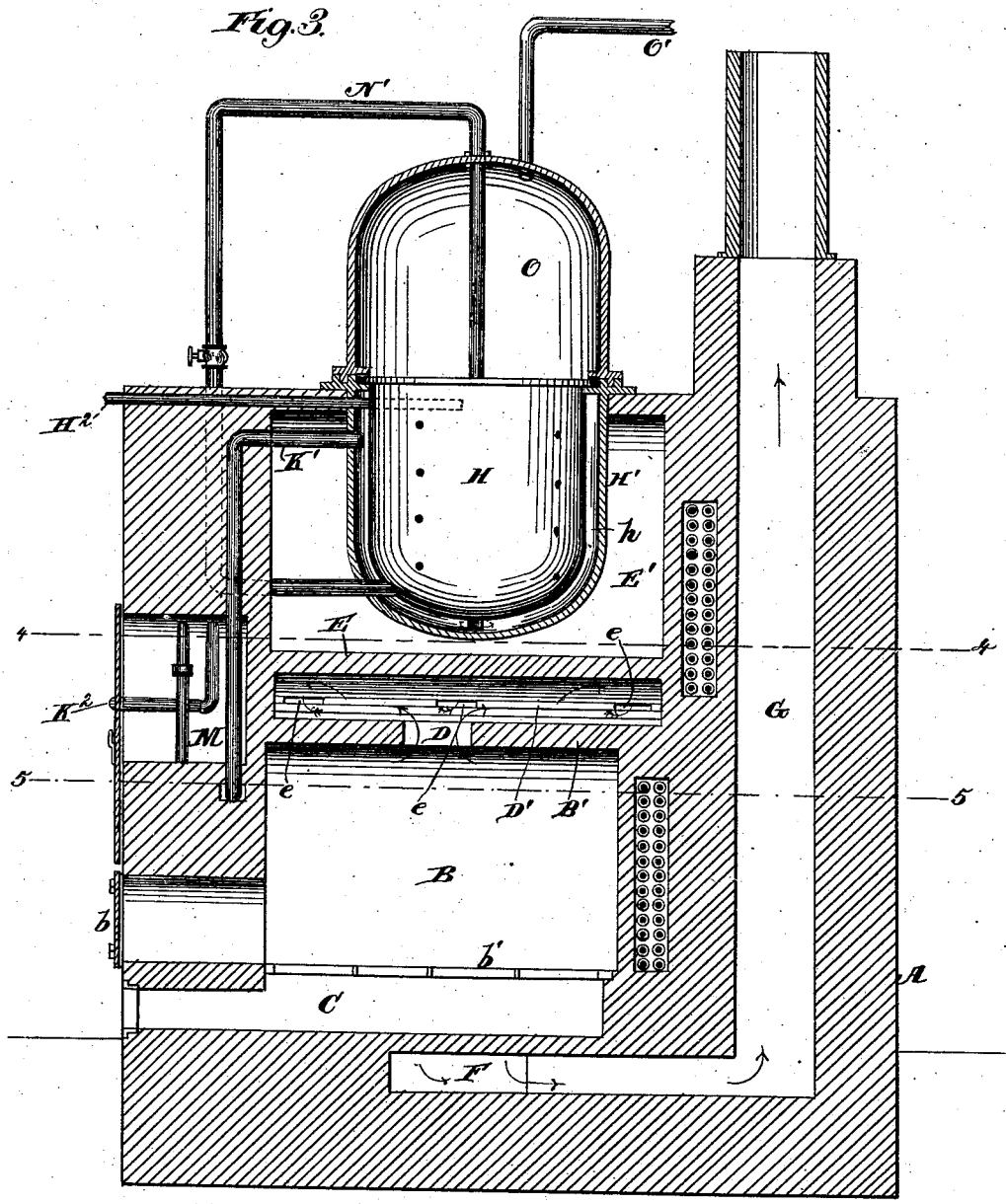
Figure 4:
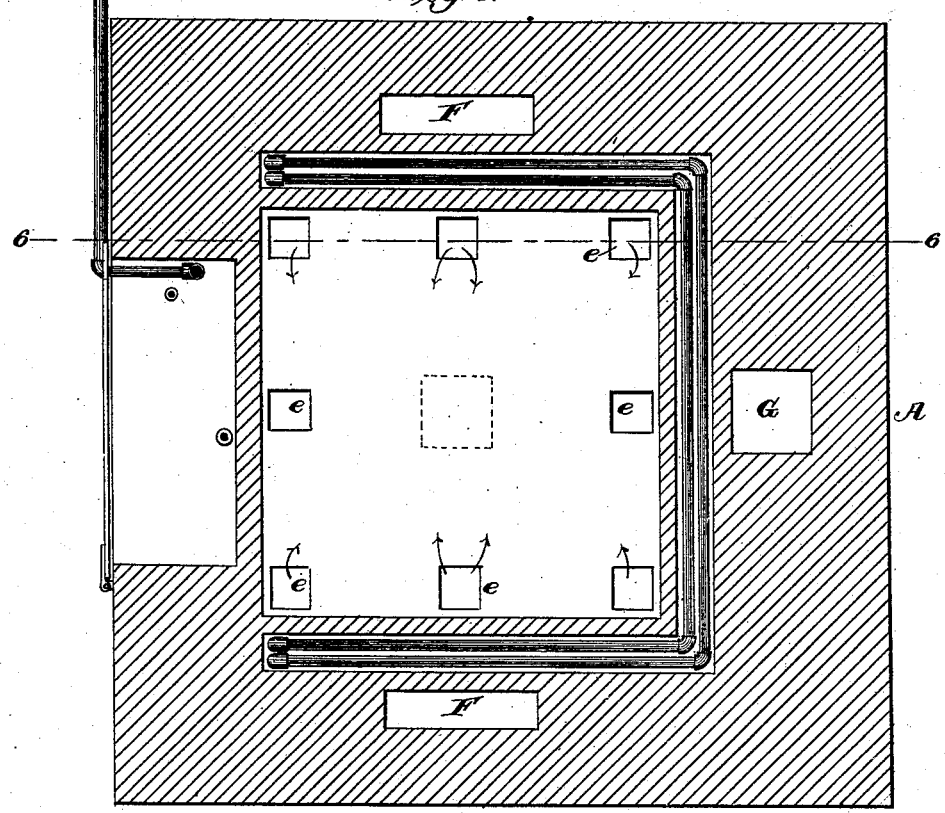
Figure 5:
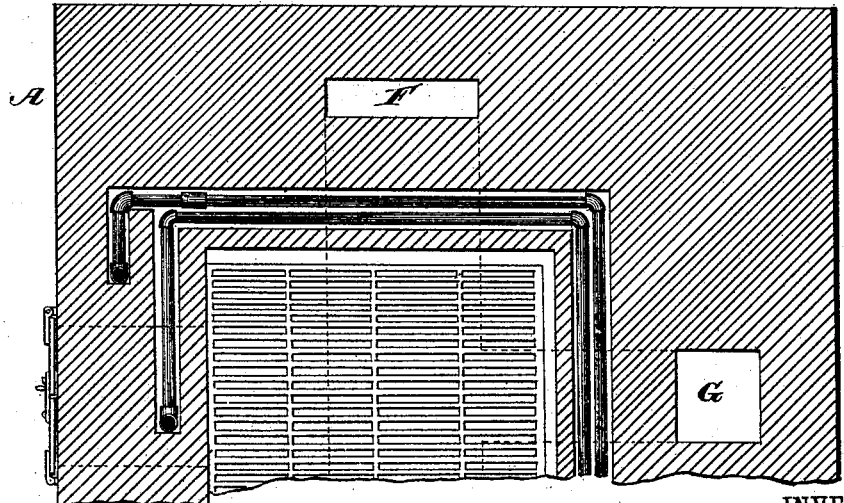

Figure 1 is a front elevation of my improved apparatus, with portions of the brick-work of the furnace broken away so as to illustrate the steam-coils and their connections. Fig. 2 is a transverse vertical section, with the vaporizing-cylinder shown in elevation. Fig. 3 is a longitudinal section, taken on a plane at right angles to Fig. 2. Fig. 4 is a horizontal section, taken on a plane indicated by dotted line 4 4, Fig. 3. Fig. 5 is a similar section, taken on a plane indicated by dotted line 5 5, Fig. 3, a portion of the furnace being in this instance broken away. Fig. 6 is a vertical section, taken on a plane indicated by dotted line 6 6, Fig. 4. Fig. 7 is an enlarged sectional view, taken on a vertical plane through the vaporizer. Fig. 8 is a horizontal section, taken through Fig. 7.

Referring by letter to the drawings, A indicates the brick-work of the furnace, which is provided with a suitable fire-place, B, having the usual doors, *b*, for a passage, which is formed through the brick-work at the front of the furnace. An ordinary draft-passage, C, is formed below the grate-bars *b'*, and the fire-place is covered by an arch, B', having a central opening, D, for the passage of the flame and products of combustion. A second upper arch, E, is located above the arch B', so as to leave a space, D', between the two, and said upper arch is provided with a marginal series of openings, *e*, which allow the heat and products of combustion from space D' to pass up into the chamber above the upper arch.

By arranging an opening centrally in the lower arch and forming the openings in the upper arch along the sides of the latter it will be seen that the flames entering the space between said arches will impinge against the upper arch and be spread over the under surface of the same without entering the chamber above the upper arch; also, that the heat is equally distributed over said surface, and hence the upper arch, which constitutes a bottom for chamber E', will be thoroughly heated. The jacketed vaporizing cylinder or vessel is located within said chamber, and hence it is desirable to prevent the flames from entering such chamber and coming in contact with the jacketed vaporizing-vessel, which would be burned if subjected to the direct action of the flame. This is accomplished by forming the passages through the arches, as already described. The products of combustion from chamber E' are conducted to the stack G by the flues F, formed through the walls of the brick-work, and leading from the top of said chamber to the bottom of the stack, as best shown in Fig. 2.

H indicates the vaporizing cylinder or vessel, which is open at the top and provided with a jacket, H', arranged within the chamber E, whereby said jacket will be heated, and hence a high temperature maintained within the space $h$, between the vaporizing-cylinder and its jacket. Oil is supplied to the vaporizing-vessel by a pipe, $H^2$, said pipe entering the vessel, and having its discharge end terminating over a suitable pan located in the vessel for distributing the oil therein. The said jacket and vaporizing-vessel are connected by means of the angular interlocking flanges $h'$ $h'$, respectively, provided at the upper edges of said parts, whereby the vessel is supported within the jacket and the steam-space $h$ closed at the top.

Superheated steam enters the space between the vaporizing-cylinder and its jacket through a pipe, $K'$, which connects with one of a set of connected steam-coils or return-pipes, in which steam from the boiler or from a coil under the boiler is superheated. These pipes are disposed as follows, so as to insure the steam being effectively heated as it passes through the coils on its way to the vaporizer. Upper and lower sets of return-pipes, I and K, are arranged within spaces in the walls of the furnace, the pipes of the upper set being extended around three sides of the chamber $E'$ and those of the lower set being extended around three sides of the fire-place. Each one of these sets of return-pipes comprises two parallel series of horizontal return-pipes arranged side by side and connected at the ends of the series.

A steam-pipe, $K^2$, preferably leading from a steam-coil under a boiler, connects with the outer series of pipes of the upper set of return-pipes K, said connection being made either at the top or the bottom of said series. The steam passing through said outer series enters the adjacent inner series of pipes, either at the bottom or the top of the series, and then from said series is conducted by pipe-connection M to the outer or inner series of the lower set of return-pipes, K, or to the inner series of said set, as may be preferred. Said connection can also be made with the upper or the lower pipe of the series. From thence the steam passes to the next series of pipes of said set, connection between the two series being made either at the top or the bottom, and from thence passes up through pipe $K'$ to the upper portion of the steam-space, between the vaporizing cylinder or vessel and its surrounding jacket. By such disposition of the return-pipes from one thousand to fifteen hundred feet can be employed, and hence the steam passed over a large heating-surface, whereby the steam before entering the space between the vaporizing-cylinder and its jacket will be highly superheated.

$M'$ refers to a series of horizontal pipes or flues arranged across the chamber in the vaporizing-cylinder and alternately located transversely to each other. These pipes open at both ends into the space around the vaporizing-vessel, whereby the steam circulating through such pipes will heat them, and thus serve to thoroughly heat the liquid hydrocarbon or other oleaginous matter contained within said vessel.

Within the vaporizing cylinder or vessel I arrange a succession of horizontal coils, $K^3$, of steam-pipes, connected together and adapted to open at the bottom of the set of coils into the steam-space $h$ under the vaporizing-vessel. These coils can be connected together in several ways. As herein shown, a vertical pipe, N, is arranged within the vaporizing-vessel and adapted to open at its lower end into the steam-space $h$. The coils $K^3$, which are arranged over the cross-flues $M'$, connect at their ends with the vertical pipe, the outer end of each coil being bent back or inwardly over the coil, as shown in Fig. 8, so as to connect with the central vertical pipe. In such case a partition will be arranged in the vertical pipe between the two ends of each coil; but in lieu of such arrangement it will be obvious that the inner end of the lower coil could be connected with the pipe N, and the outer end of said coil then bent back and up, so as to connect with the inner end of the next upper coil, and so on throughout the series to the last upper coil, in which its outer end could be bent back and connected with pipe N. In such instance a partition will be placed in pipe N, between the ends of the two end coils of the series, whereby the steam passing from space $h$ into said pipe will from the latter enter the lowest coil, and then, passing through the series of coils, finally pass into the upper end of pipe N, which, by means of suitable pipe-connection, $N'$, communicates with a return-pipe, $N^2$, which enters the vaporizing cylinder or vessel, near the bottom thereof, so as to inject the steam into the oil contained therein. These coils serve to highly heat the oil within the vaporizing-vessel, and are assisted in such action by the cross-flue $M'$, already described. The liquid hydrocarbon, being vaporized, rises into the dome O, and from thence is conducted by a pipe-line, $O'$, to the burner.

In order to form a tight joint between the vaporizing-cylinder and its dome, I provide the upper end of the jacket H with an annular flange, $H^2$, which rests on the brick-work, and in which is formed a continuous grooved seat, $H^3$, adapted to receive an annular vertical flange, $O^2$, depending from a flange formed around the base of the dome. A suitable quantity of cement is placed in said seat, and the flange $O^2$ fitted therein and forced down by means of screw-rods P, which pass through a cross-bar, $P'$, supported on the dome, and rest at their lower ends on the flange, with which the base of the dome is provided. The ends of the cross-bar are connected by tie-rods $P^2$ with lugs on the annular flange of the jacket H, so that by turning the screw-rods P one way they will tend to draw the flanges of the dome and jacket closely together.

It is absolutely essential that the steam should have a high temperature before entering the vaporizing-chamber, so as to vaporize the hydrocarbon and carry it off in the form of gas. To such end I dispose the return-pipes in the furnace-walls, as herein described, so that after the steam leaves the coil under the boiler its temperature is constantly increased until it arrives at the desired degree, say 2600° Fahrenheit.

Having thus described my invention, what I claim is—

1. In an apparatus for generating vapor from liquid hydrocarbon, the combination, with a vessel jacketed to form a surrounding steam-space, of an upright pipe communicating at its lower end with the said steam-space, a series of coiled pipes connected at each end with the upright pipe, and a pipe connected with the steam-space around the vaporizing-vessel to deliver superheated steam therein, substantially as and for the purpose described.

2. In an apparatus for generating vapor from liquid hydrocarbon, the combination, with a vaporizing-vessel jacketed to form a surrounding steam-space, of a vertical pipe arranged therein, with its lower end in communication with the steam-space around the vaporizing-vessel, and its other end extending outside the vessel and connected with the interior thereof, a series of steam-coils having their ends connected with the upright steam-pipe, and a pipe connected with the steam-space around the vaporizing-vessel to deliver superheated steam therein, substantially as and for the purpose described.

3. In an apparatus for generating vapor from liquid hydrocarbon, the combination, with a vaporizing-vessel jacketed to form a surrounding steam-space, of a vertical pipe arranged therein, with its lower end in communication with the steam-space around the vaporizing-vessel and its other end extending outside the vessel and connected with the interior thereof, adjacent to its bottom, a series of independent pipes coiled around the said vertical pipe and having each end connected therewith, and a pipe connected with a superheating-coil for conveying superheated steam to the space around the jacket, substantially as described.

4. The combination, with the sets of return steam-pipes passing through the furnace-walls, of the vaporizing-vessel surrounded by a jacket and provided with the set of connected coils $K^3$, opening at the end of the set into the steam-space under the vaporizing-vessel, and at the upper end of the set connected with a return-pipe which passes out through the dome and thence downward to the lower portion of the vaporizing-vessel, and a pipe for delivering superheated steam to the steam-space around the vaporizing-vessel, substantially as described.

5. The jacketed receiver provided with the set of connected coils $K^3$, and the series of horizontal pipes $M'$, opening at their ends into the steam-space between the vaporizing-vessel and its jacket, substantially as described.

6. The combination, with the jacket for the vaporizing-vessel, provided with a flange having an annular seat, of the dome having at its base an annular flange in said seat, substantially as described.

7. The combination, with a jacket for the vaporizing-vessel, provided with a flange having an annular seat, of the dome provided at its base with an annular flange secured in said seat, the cross-bar supported by the dome, the screw-rods P and the rods $P^2$, the former passing through the cross-bar and bearing on a flanged portion of the dome, and the latter connecting the cross-bar with a flange on the jacket, substantially as described.

8. In an apparatus for generating vapor from liquid hydrocarbon, the combination and arrangement of the fire-place B, the two arches $B'$ and E, provided respectively with the passages D and $e$, the chamber $E'$, the jacketed vaporizing-vessel depending in the said chamber, with its bottom arranged adjacent to the upper arch, and the vertical side flues, F F, leading from the upper end of the chamber $E'$ to the base of the stack, substantially as described.

9. In an apparatus for generating vapor from liquid hydrocarbon, the combination and arrangement of the fire-place B, the two arches $B'$ and E, provided respectively with the passages D and $e$, the chamber $E'$, the jacketed vaporizing-vessel depending in the said chamber, with its bottom arranged adjacent to the upper arch, the vertical side flues, F F, leading from the upper end of the chamber $E'$ to the base of the stack, the double set of steam-pipes K, and double set of pipes I, located respectively in the walls around the chamber $E'$ and the fire-place B, said pipes being connected together and with the steam-space around the vaporizing vessel, substantially as described.

10. The combination, with the jacketed vaporizing-vessel provided with steam-coils $K^3$, of the sets of steam-pipes I and K, located and communicating with the steam-space around the vaporizing-vessel, substantially as described.

In testimony whereof I have hereunto set my hand in the presence of two subscribing witnesses.

W. H. BROOKS.

Witnesses:
JAMES L. NORRIS,
JOS. L. COOMBS.